(12) United States Patent
Deng et al.

(10) Patent No.: US 9,501,192 B2
(45) Date of Patent: Nov. 22, 2016

(54) SINGLE-LAYER CAPACITIVE TOUCH SENSOR AND TOUCH CONTROL TERMINAL

(71) Applicant: Shenzhen Huiding Technology Co., Ltd., Shenzhen, Guangdong (CN)

(72) Inventors: Gengchun Deng, Guangdong (CN); Hai Li, Guangdong (CN); Wu Liu, Guangdong (CN)

(73) Assignee: Shenzhen Huiding Technology Co., Ltd., Guangdong (CN)

( * ) Notice: Subject to any disclaimer, the term of this patent is extended or adjusted under 35 U.S.C. 154(b) by 111 days.

(21) Appl. No.: 14/548,449

(22) Filed: Nov. 20, 2014

(65) Prior Publication Data

US 2015/0091866 A1 Apr. 2, 2015

Related U.S. Application Data

(63) Continuation of application No. PCT/CN2013/088884, filed on Dec. 9, 2013.

(30) Foreign Application Priority Data

Jan. 25, 2013 (CN) .......................... 2013 1 0028656

(51) Int. Cl.
*G06F 3/044* (2006.01)
(52) U.S. Cl.
CPC ..................................... *G06F 3/044* (2013.01)
(58) Field of Classification Search
None
See application file for complete search history.

(56) References Cited

U.S. PATENT DOCUMENTS

2013/0100038 A1* 4/2013 Yilmaz .................. G06F 3/044
345/173
2013/0329347 A1* 12/2013 Kuo ..................... H03K 17/962
361/679.01
2014/0320199 A1* 10/2014 Trend ..................... G06F 3/044
327/517

FOREIGN PATENT DOCUMENTS

| CN | 102292694 | 12/2011 |
| CN | 102364421 | 2/2012 |
| CN | 102799329 | 11/2012 |
| CN | 103105991 | 5/2013 |
| CN | 203070264 | 7/2013 |

OTHER PUBLICATIONS

International Search Report of PCT/CN2013/088884 dated Mar. 13, 2014, 6 pages.

* cited by examiner

*Primary Examiner* — Dwayne Bost
*Assistant Examiner* — Christopher Kohlman
(74) *Attorney, Agent, or Firm* — Rankin, Hill & Clark LLP

(57) ABSTRACT

The present invention relates to the touch control technology filed. Provided are a single-layer capacitive touch sensor and a touch control terminal, wherein a substrate of the single-layer capacitive touch sensor is distributed with several rows of induction electrode and drive electrode pairs with electrode extension parts mutually interlocked, and several ground electrodes located between saturated surfaces of adjacent induction electrodes. According to the present invention, two types of electrodes are designed into an interlocking shape, a capacitive structure is formed through interlocked parts, making wiring simpler, and furthermore, the ground electrodes are added on the substrate, and an area to the ground is enlarged, thereby reducing a suspension effect.

9 Claims, 5 Drawing Sheets

SINGLE-LAYER CAPACITIVE TOUCH SENSOR AND TOUCH CONTROL TERMINAL

FIELD OF THE INVENTION

The present invention relates to the touch control technology filed, and in particular, to a single-layer capacitive touch sensor and a touch control terminal.

BACKGROUND OF THE INVENTION

A conventional capacitive touch sensor usually requires a multiple-layer conductive material structure; although some sensors are implemented by using a single-layer conductive material structure, a jumper needs to be added at an X direction-Y direction intersection point to form a network with the two dimensions X and Y intersecting with each other, that is, a structure needs to be designed, in which electrodes in one of the dimensions are designed to form a jumper over electrodes in the other dimension. When making the jumper structure, an insulation layer needs to be first distributed at an intersection position, and then jumpers that are formed by a conductive material are distributed on the insulation layer. This type of wiring is very complex and has a high requirement for technique accuracy.

At present, according to touch detection technologies of the capacitive touch sensor, two manners are available: mutual capacitance detection and self-capacitance detection. The mutual capacitance detection manner features multi-point touch, which enables it to become a mainstream capacitive touch detection technology, but meanwhile, the mutual capacitance detection has some disadvantages, such as a suspension effect. The suspension effect refers to that, when a touch control terminal is placed on a surface of a high-insulation object (that is, is in a suspension state) and the touch control terminal is touched by a big finger (such as a thumb), touch area is smaller than that of another smaller finger. As a requirement for user experience becomes higher, the suspension effect becomes an important disadvantage of performance of a product that adopts the mutual capacitance detection.

A principle of the suspension effect of the mutual capacitance is as follows: in a non-suspension state, capacitance of human body to the ground is large and a signal has large coupling with the ground through the capacitance and impedance of the human body to the ground, and therefore node capacitance is reduced by cutting magnetic induction lines and a corresponding change can be detected; and in a suspension state, the capacitance to the ground is very small, and a signal can barely passes through, when large-area pressing is performed (such as touching by a thumb), position capacitance of a center of the pressed area increases and capacitance of surrounding areas decreases due to the suspension effect, which is contrary to expectations. A main representation of the suspension effect is that a pressing splitting point of the thumb and a large area are difficult to determine.

At present, a main method for resolving this problem is to use a metal shell, enlarge an area to the ground of a device, and reduce coupling capacitance of drive, induction, and a finger. However, the metal shell has a limitation that it must contact a finger; enlarging the area to the ground is limited by a product, and reducing the coupling capacitance of drive, induction, and a finger affects a single to noise ratio.

Therefore, how to simplify a wiring technique of a single-layer capacitive touch sensor and reduce the suspension effect of the capacitive touch sensor has currently become a problem that is urgent to solve.

SUMMARY

The present invention provides a single-layer capacitive touch sensor, and aims to reduce the suspension effect of the existing capacitive touch sensor and solve a technology problem that the wiring technique of the existing capacitive touch sensor is complex.

The present invention adopts the following technical solutions:

A single-layer capacitive touch sensor, including a substrate, where the substrate is distributed with:
several induction electrodes arranged in a first direction, where the induction electrodes include induction electrode blocks distributed in the first direction and several induction electrode extension parts extended from the induction electrode blocks on a same side of the induction electrode blocks in a second direction, the first direction is perpendicular with the second direction, and induction electrode extension parts of adjacent induction electrodes are extended in opposite directions;
several drive electrodes arranged in the second direction, where each row of drive electrodes include drive electrode units, the number of which is the same as the number of columns of induction electrodes, the drive electrode units include drive electrode blocks distributed in the first direction and several drive electrode extension parts extended from the drive electrode blocks on a same side of the drive electrode blocks in a direction opposite to the second direction, so that the drive electrode extension parts are interlocked with the corresponding induction electrode extension parts; and
several ground electrodes arranged in the first direction and located between saturated surfaces of adjacent induction electrodes.

The present invention further provides a touch control terminal, where the touch control terminal adopts the single-layer capacitive touch sensor according the present invention.

Technical effects of the present invention are that: in a single-layer inductive material structure, an interlocked structure is designed for a drive electrode and an induction electrode, and by forming the interlocked part into a capacitive structure, a jumper no longer needs to be designed, which simplifies wiring and reduces a requirement for a technique condition to some extent, and the structure is simple and easy to process. Further, a block-shaped ground electrode is disposed on a substrate, and by enlarging an area to the ground, a suspension effect of a single-layer capacitive touch sensor is reduced and meanwhile a blind area of the substrate are fully used.

REFERENCE NUMERALS

Figure 1:
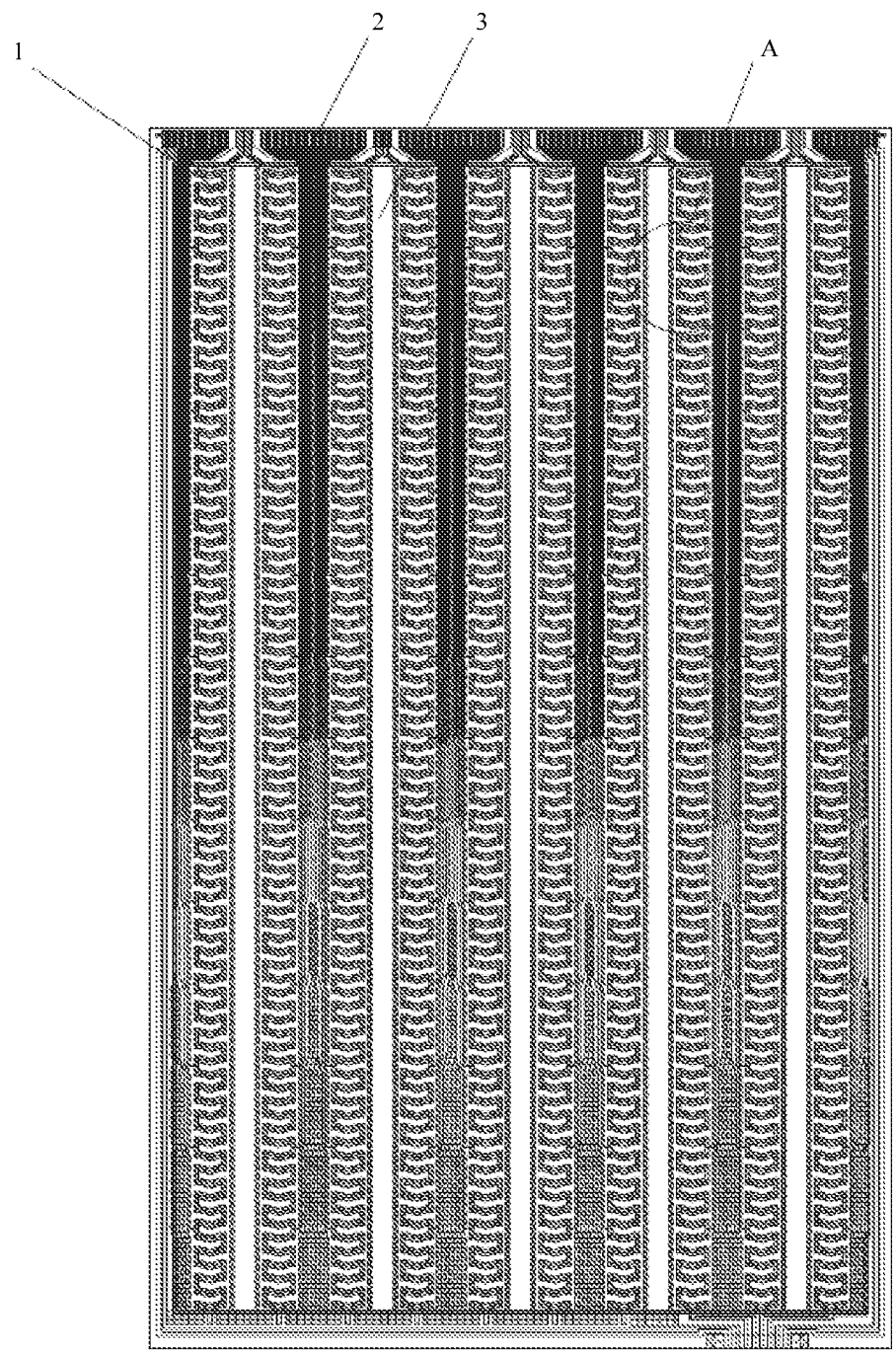
FIG. 1 is a schematic wiring diagram of a single-layer capacitive touch sensor according to Embodiment 1 of the present invention.

Induction electrode 1
Induction electrode block 11
Induction electrode extension part 12
Drive electrode 2
Drive electrode block 21
Drive electrode extension part 22
Drive electrode wire 23
Ground electrode 3
First suspension block 41
Second suspension block 42
Third suspension block 43

DESCRIPTION OF EMBODIMENTS

To make the objectives, technical solutions, and advantages of the present invention more comprehensible, the following further specifically describes the present invention with reference to accompanying drawings and embodiments. It should be understood that, the described specific embodiments are only used to explain the present invention, but not to limit the present invention.

The present invention provides a single-layer capacitive touch sensor, including a substrate, where the substrate is distributed with several induction electrodes arranged in a first direction, where the induction electrodes include induction electrode blocks distributed in the first direction and several induction electrode extension parts extended from the induction electrode blocks on a same side of the induction electrode blocks, the first direction is perpendicular with the second direction, and induction electrode extension parts of adjacent induction electrodes are extended in opposite directions.

The substrate is also distributed with several drive electrodes arranged in the second direction, where each row of drive electrodes include drive electrode units, the number of which is the same as the number of columns of induction electrodes, the drive electrode units include drive electrode blocks distributed in the first direction and several drive electrode extension parts extended from the drive electrode blocks on a same side of the drive electrode blocks in a direction opposite to the second direction, so that the drive electrode extension parts interlock with the corresponding induction electrode extension parts, and node blocks formed by the interlocked parts are effective touch nodes.

The substrate is also distributed with several ground electrodes arranged in the first direction and located between saturated surfaces of adjacent induction electrodes, where a saturated surface is a surface, which is totally smooth, of an induction electrode, and in the present invention, the induction electrode saturated surfaces are surfaces corresponding to the induction electrode blocks of the induction electrodes, and non-saturated surfaces are surfaces corresponding to the induction electrode extension parts. Similarly, the drive electrode saturated surfaces are surfaces corresponding to the drive electrode blocks of the drive electrodes, non-saturated surfaces are surfaces corresponding to the drive electrode extension parts. No wire exists in an area between the saturated surfaces of adjacent induction electrodes, and generally, the area is provide with suspension blocks, so as to ensure flatness and light transmittance of the whole substrate, where the suspension blocks are independent electrical metal wires without any wire connection. However, in the present invention, the suspension blocks are replaced with the ground electrodes, which further enlarges an area to the ground and may reduce a suspension effect of the capacitive touch sensor. In the present invention, the induction electrodes, the drive electrodes, the ground electrodes, and the suspension blocks all can use a same material, such as a conductive material like ITO.

The present invention also provides a touch control terminal that adopts the foregoing single-layer capacitive touch sensor.

In the embodiments of the present invention, an induction electrode and a drive electrode are designed to a form with extension parts interlocked, and by forming an interlocked part into a capacitive structure, a jumper no longer needs to be designed and wiring is simplified, so that a capacitive touch sensor has a simple structure and is easy to process. On a basis of the electrode design, a ground electrode is added to an area between saturated surfaces of adjacent induction electrodes, which enlarges an area to the ground, thereby greatly reducing a suspension effect of the capacitive touch sensor.

Embodiment 1

Figure 2:
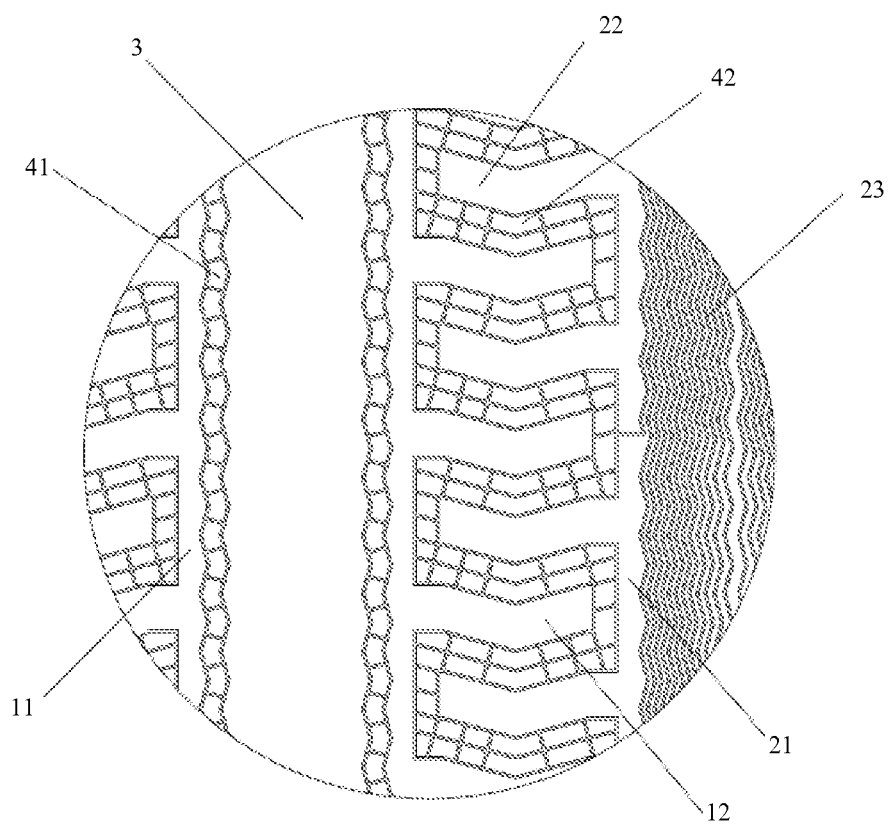
FIG. 2 is a schematic diagram of enlarged part A shown in FIG. 1.

FIG. 1 and FIG. 2 show a single-layer capacitive touch sensor according to Embodiment 1 of the present invention. In this embodiment, a vertical direction is used as a first direction and a horizontal direction is used as a second direction. It can be learnt from the figure that, a substrate of the single-layer capacitive touch sensor is distributed with several induction electrodes 1 arranged in the vertical direction (electrically connected to RX), several drive electrodes 2 arranged in the horizontal direction (electrically connected to TX), and several ground electrodes 3 arranged in the vertical direction (electrically connected to GND). A drive electrode wire 23 is connected to a flexible printed circuit (Flexible Printed Circuit, FPC) that is bound to the substrate.

The induction electrodes 1 include induction electrode blocks 11 and several induction electrode extension parts 12 extended from the induction electrode blocks 11 on a same side of the induction electrode blocks 11 in the horizontal direction. Induction electrode extension parts 11 of adjacent induction electrodes 1 are extended in opposite directions, so that a face-to-face structure is formed. Each row of drive electrodes 2 include drive electrode units, the number of which is the same as the number of columns of induction electrodes 1, so that each column of induction electrodes 1 corresponds to several rows of drive electrode units. Each drive electrode unit includes drive electrode blocks 21 distributed in the vertical direction and several drive electrode extension parts 22 extended from the drive electrode blocks 21 on a same side of the drive electrode blocks 21 in the horizontal direction, for example, each drive electrode block 21 may include 3 to 5 drive electrode extension parts 22. In the figure, the induction electrodes 1 and the drive electrodes 2 are arranged in the horizontal direction in the following form, in which electrodes of a same type are arranged back to back, "drive-induction-induction-drive-drive-induction-induction-drive . . . ".

The drive electrode extension parts 22 and the induction electrode extension parts 12 corresponding to the drive electrode extension parts 22 are extended in opposite directions, so that the drive electrode extension parts 22 are interlocked with the corresponding induction electrode extension parts 12. Interlocked positions of the induction electrode extension parts 12 and drive electrode extension parts 22 form a capacitive structure. In this case, the induction electrode extension parts 12 may induce in real time an electricity change on the drive electrode extension parts 22, so that single-layer touch detection is implemented without a jumper, thereby simplifying wiring and reduce a requirement for a technique condition to some extent, and the structure is simple and easy to process. An interval between the induction electrode extension parts 12 and the drive electrode extension parts 22 may be appropriately chosen according to a requirement for a technique and an electric field divergence, and a preferred interval is greater than or equal to 0.1 mm and is less than or equal to 0.6 mm.

In this embodiment, an area between the induction electrode extension parts 12 and the drive electrode extension parts 22 may be provided with third suspension blocks 43. A function of the third suspension blocks 43 leads to a more divergent electric field between drive and induction and it is favorable to touch a change; another function is a total area of the drive the induction in the node part may be effectively reduced and an interference signal generated when induction is introduced by a finger becomes small in a suspension situation. Therefore, in this embodiment, the induction electrode blocks 11, the induction electrode extension parts 12, the drive electrode blocks 21, the drive electrode extension parts 22, the third suspension blocks 43, and gaps between the suspension blocks 43 constitute a complete touch detection node.

In this embodiment, a unilateral outlet manner is adopted, that is, only one edge (upper edge in this embodiment) of the substrate is bound to a flexible printed circuit board. The drive electrode wires 23 are connected to this flexible printed circuit board, both sides of the drive electrode wires 23 are adjacent to the drive electrodes 2, and the drive electrodes 2 separate their wires 23 from the induction electrodes 1, so as to shield an interference signal between the drive electrode wires 23 and the induction electrodes 1. Specifically, the drive electrodes 2 separate their wires 23 from the induction electrodes 1, and grounding may be performed when there is no scanning; therefore an electric field between the drive electrode wires 23 and the induction electrodes 1 are completely absorbed by the in-between drive electrode blocks 21, mutual capacitance is zero, and no interference data is generated when an wiring area is touched. An optimal effect of this unilateral outlet manner is that it may adapt to up to 100 ohm.

In this embodiment, the substrate is also distributed with several ground electrodes 3 arranged in the vertical direction and located between saturated surfaces of adjacent induction electrodes. In this embodiment, saturated surfaces of each pair of adjacent induction electrodes is provided with one ground electrode 3, and ground electrodes are distributed in strip. A width of the ground electrodes 3 may be less than or equal to 2.2 mm, and a too large width may affect degree of linearity of the capacitive touch sensor. In this embodiment, a void area between the ground electrodes 3 and the induction electrode blocks 11 is provided with second suspension blocks 42, and a function of the second suspension blocks 42 is to reduce signal attenuation of the induction electrodes 1.

In this embodiment, the induction electrode extension parts 12, the drive electrode extension parts 22, and the ground electrodes 3 are all in a wavy structure, and this wavy structure design may improve a visual effect of the capacitive touch sensor compared with a conventional line rectangle design.

Embodiment 2

Embodiment 2 of the present invention also provides a single-layer capacitive touch sensor. What is different from Embodiment 1 is that this embodiment adopts a bilateral outlet manner, that is, both the upper and bottom edges of a substrate are bond to flexible printed circuit boards, drive electrode wires 23 are connected to corresponding nearby flexible printed circuit boards on upper and bottom edges of the substrate. This manner of binding the flexible printed circuit boards to the upper and bottom edges may shorten drive electrode wires 22 to a half and increase by twice the square resistance to which it can adapt, thereby adapting to boarder range of drive frequencies. An optimal effect of this bilateral outlet manner is that it may adapt to up to 200 ohm. The rest part of this embodiment is similar to that of Embodiment 1, which is not further described herein.

Embodiment 3

Embodiment 3 of the present invention also provides a single-layer capacitive touch sensor. What is different from Embodiment 1 is that induction electrode extension parts 12, drive electrode extension parts 22, and ground electrodes 3 are all in a rectangle structure. A function of rectangle symmetrical interlocking leads to evener distribution of node capacitance and a larger effective touch region, and another function is to decrease effective enfilade area of induction electrodes 1 and a wring region and decrease mutual capacitance of the induction electrodes 1 and the wiring region. The rest part of this embodiment is similar to that of Embodiment 1, which is not further described herein.

Embodiment 4

Figure 3:
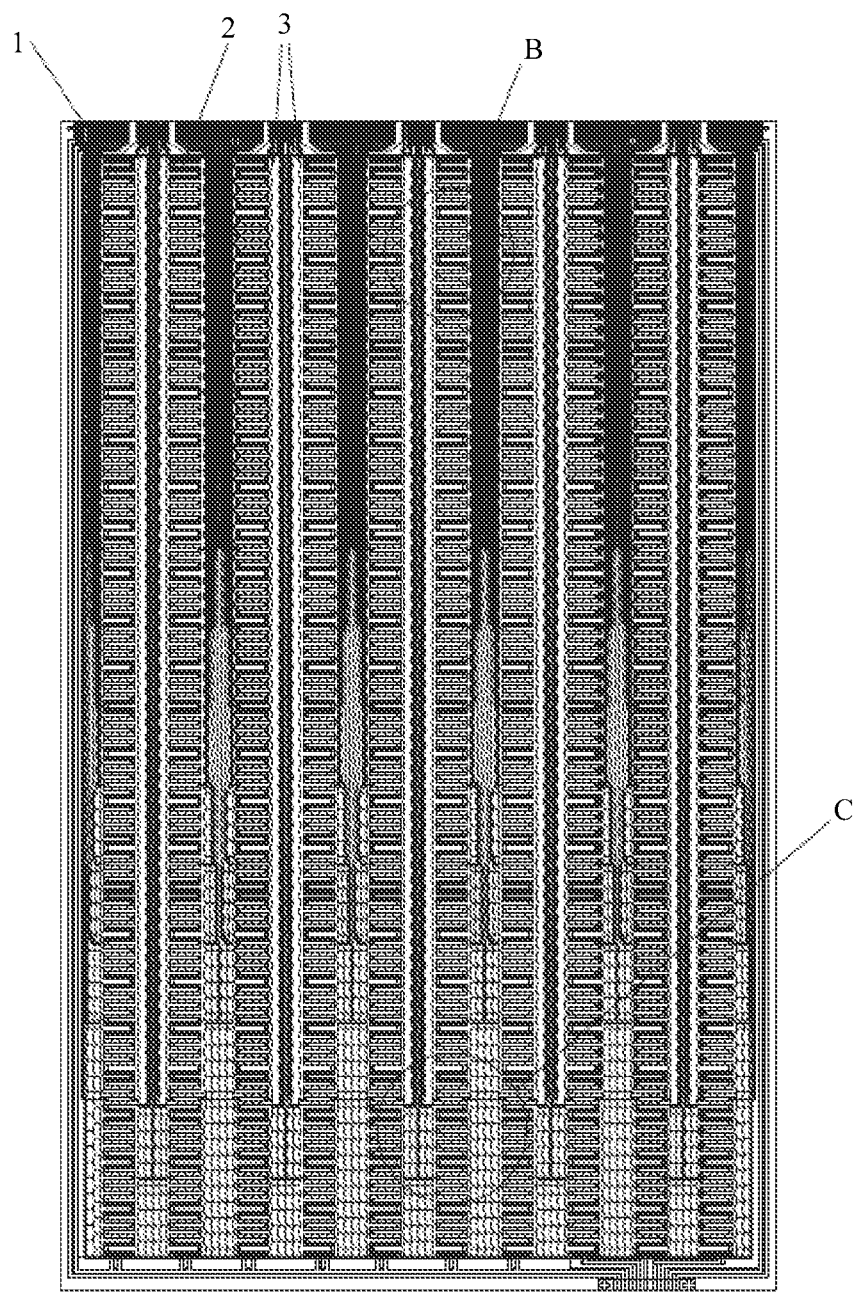
FIG. 3 is a schematic wiring diagram of a single-layer capacitive touch sensor according to Embodiment 4 of the present invention.
Figure 4:
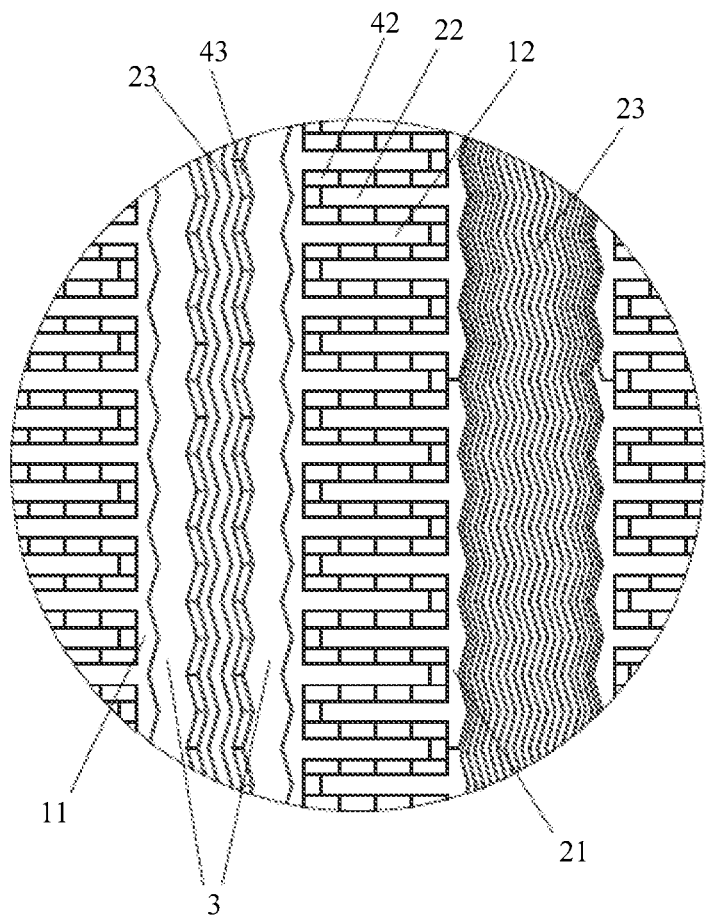
FIG. 4 is a schematic diagram of enlarged part B shown in FIG. 3.
Figure 5:
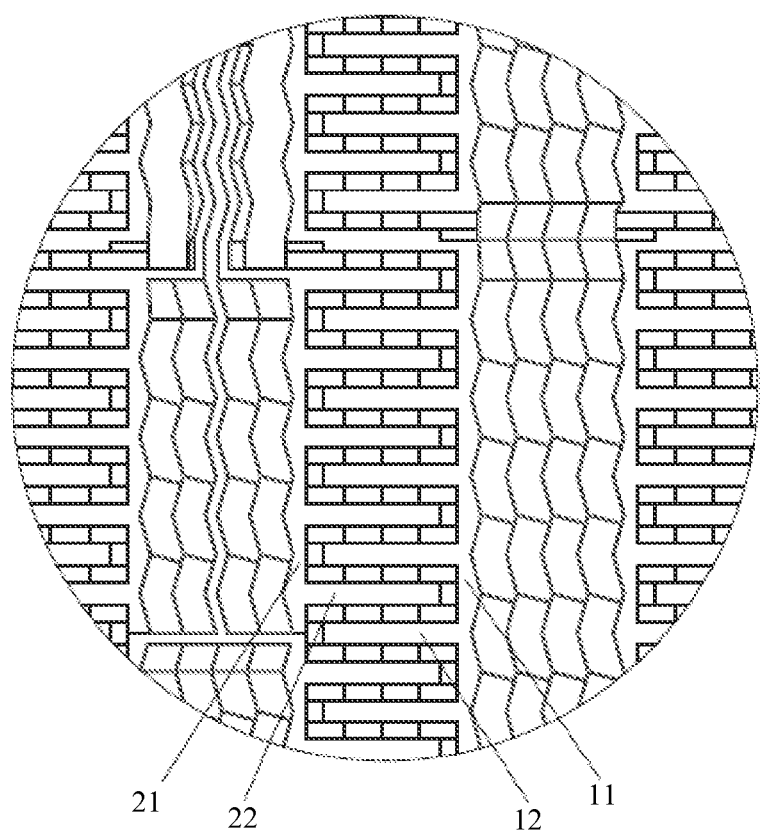
FIG. 5 is a schematic diagram of enlarged part C shown in FIG. 3.

FIG. 3, FIG. 4 and FIG. 5 show a single-layer capacitive touch sensor according to Embodiment 4 of the present invention. Similarly, content that is the same as that in Embodiment 1 is not further described.

It can be learnt from the figures that, differences between this embodiment and Embodiment 1 are that: two ground electrodes 3 are distributed in strip between saturated surfaces of each pair of adjacent induction electrodes; and twisting is performed on wires 23 of drive electrode units in the last two rows, that is, layout of the drive wires 23 of the drive electrode units in the last two rows is changed from between two drive electrodes in Embodiment 1 to between two ground electrodes 3 between adjacent induction electrodes 1. As shown in the figures, both sides of wires 23 of at most two rows (two rows in this embodiment) of drive electrode units that are the farthest away from a FPC are adjacent to the ground electrodes 3, both sides of wires 23 of the rest of drive electrodes are adjacent to drive electrodes 2, so that the rest of drive electrodes separate their wires from induction electrodes. For a unilateral wiring situation, this wiring manner avoids too thin wires, and drive electrode wires 23 are divided to be outlet from two areas, which may reduce technique pressure.

In this embodiment, drive electrode wires 23 are also distributed between two ground electrodes 3, to prevent impact of the drive electrode wires 23 on the induction electrodes 1, a width of the ground electrodes 3 is greater than or equal to twice a width of induction electrode blocks 11. For example, when the width of the induction electrode blocks 11 is 0.3 mm, the width of the ground electrodes 3 is greater than or equal to 0.6 mm. In this embodiment, no suspension block exists between the ground electrodes 3 and the induction electrode blocks 11. However, it should be understood that, as a variation of this embodiment, suspension blocks (second suspension blocks 42) may be provided between the ground electrodes 3 and the induction electrode blocks 11, so as to reduce signal attenuation of the induction electrodes 1. In this embodiment, a void area between the ground electrodes 3 and wires of at most two rows of drive electrodes that are the farthest away from a flexible printed circuit board is provided with first suspension blocks 41. A function of the first suspension blocks 41 is to reduce an attenuation degree of the ground electrodes 3 on the drive electrode wires 23. However, as another variation of the this embodiment, if insertion of the first suspension blocks 41 in the interval between the ground electrodes 3 and the drive electrode wires 23 does not meet a technique requirement, the first suspension blocks 41 may be not inserted. In this embodiment, induction electrode extension parts 12 and drive electrode extension parts 22 are both in a rectangle shape. However, it should be understood that, they may also be in a wavy structure as in Embodiment 1.

In this specification, descriptions about directions have relative meanings. For example, when a first direction is specified as a vertical direction, a second direction that is perpendicular to the first direction is a horizontal direction; on the contrary, when the first direction is specified as a horizontal direction, the second direction that is perpendicular to the first direction is a vertical direction. In addition, although descriptions in the foregoing embodiments use an example in which the single-layer capacitive touch sensor is applied as a touch screen in a mobile phone, it should be noted that, the single-layer capacitive touch sensor and a corresponding touch control terminal of the present invention may also be applied in a mobile phone, a tablet computer, various self-service terminals, and the like.

The specific embodiments of the present invention described above are not intended to limit the scope of the present invention. Any corresponding change and variation performed according to the technical idea of the present invention shall fall within the protection scope of the claims of the present invention.

What is claimed is:

1. A single-layer capacitive touch sensor, comprising a substrate, wherein the substrate is distributed with:

several induction electrodes arranged in a first direction, wherein the induction electrodes comprise induction electrode blocks distributed in the first direction and several induction electrode extension parts extended from the induction electrode blocks on a same side of the induction electrode blocks in a second direction, the first direction is perpendicular with the second direction, and induction electrode extension parts of adjacent induction electrodes are extended in opposite directions;

several drive electrodes, wherein each row of drive electrodes comprise drive electrode units, the number of which is the same as the number of columns of induction electrodes, the drive electrode units comprise drive electrode blocks distributed in the first direction and several drive electrode extension parts extended from the drive electrode blocks on a same side of the drive electrode blocks in a direction opposite to the second direction, so that the drive electrode extension parts are interlocked with the corresponding induction electrode extension parts; and several ground electrodes arranged in the first direction and located between saturated surfaces of adjacent induction electrodes;

wherein two ground electrodes are provided between the saturated surfaces of adjacent induction electrodes, and one edge of the substrate is bound to a flexible printed circuit board, wires of the drive electrodes are connected to the flexible printed circuit board, wherein wires of at most two rows of drive electrodes, which are the farthest away from the flexible printed circuit board, are located between two ground electrodes between adjacent induction electrodes.

2. The single-layer capacitive touch sensor according to claim 1, wherein one ground electrode is provided between the saturated surfaces of adjacent induction electrodes, and one edge of the substrate is bound to a flexible printed circuit board, wires of the drive electrodes are connected to the flexible printed circuit board, and both sides of the wires of the drive electrodes are adjacent to the drive electrodes, so that the drive electrodes separate wires of all the drive electrodes from the induction electrodes; or one ground electrode is provided between the saturated surfaces of adjacent induction electrodes, and both upper and bottom edges of the substrate are bounded to flexible printed circuit boards, wires of the drive electrodes are connected to corresponding nearby flexible printed circuit boards on the upper and bottom edges of the substrate, and both sides of the wires of the drive electrodes are adjacent to the drive electrodes, so that the drive electrodes separate wires of all the drive electrodes from the induction electrodes.

3. The single-layer capacitive touch sensor according to claim 1, wherein both sides of wires of the rest of drive electrodes are adjacent to the drive electrodes, so that the rest of drive electrodes separate their wires from the induction electrodes.

4. The single-layer capacitive touch sensor according to claim 1, wherein a width of the ground electrodes is greater than or equal to twice a width of the induction electrode blocks.

5. The single-layer capacitive touch sensor according to claim 1, wherein a void area between the ground electrodes and wires of at most two rows of drive electrodes that are the farthest away from the flexible printed circuit board is provided with or is not provided with first suspension blocks.

6. The single-layer capacitive touch sensor according to claim 1, wherein a void area between the ground electrodes and the induction electrode blocks is provided with second suspension blocks.

7. The single-layer capacitive touch sensor according to claim 1, wherein third suspension blocks are provided between the induction electrode extension parts and the drive electrode extension parts.

8. The single-layer capacitive touch sensor according to claim 1, the ground electrodes are in a rectangle structure and the induction electrode extension parts and the drive electrode extension parts are in a wavy structure.

9. A touch control terminal, wherein the touch control terminal adopts the single-layer capacitive touch sensor of claim 1.

* * * * *